United States Patent
Sampson et al.

(10) Patent No.: US 8,369,504 B2
(45) Date of Patent: Feb. 5, 2013

(54) CROSS CHANNEL CONTACT HISTORY MANAGEMENT

(75) Inventors: Jonathan R. Sampson, Matthews, NC (US); Timothy A. Guerry, Cornelius, NC (US); Michael N. Smith, Charlotte, NC (US); David A. Tyson, Charlotte, NC (US); Trevor Lewis, Newark, DE (US); Christopher S. Welles, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 600 days.

(21) Appl. No.: 12/407,088

(22) Filed: Mar. 19, 2009

(65) Prior Publication Data

US 2010/0239085 A1 Sep. 23, 2010

(51) Int. Cl.
*H04M 3/42* (2006.01)
*G06Q 10/00* (2012.01)
(52) U.S. Cl. .................................... 379/201.01; 705/1.1
(58) Field of Classification Search .............. 379/218.01, 379/201.01; 705/1.1
See application file for complete search history.

(56) References Cited

U.S. PATENT DOCUMENTS

| | | |
|---|---|---|
| 2004/0034661 A1 | 2/2004 | Barron et al. |
| 2006/0149571 A1 | 7/2006 | Birch et al. |
| 2007/0276715 A1 | 11/2007 | Beringer et al. |
| 2009/0225968 A1* | 9/2009 | Paranjape et al. ........ 379/201.02 |

OTHER PUBLICATIONS

International Search Report for International Application PCT/US2010/026906.

* cited by examiner

*Primary Examiner* — Rasha Al Aubaidi
(74) *Attorney, Agent, or Firm* — Weiss & Arons LLP; Michael Springs (57) ABSTRACT

Apparatus and methods for providing customer interaction information to a business channel. The apparatus and methods may involve receiving from a first business channel a first customer interaction data structure corresponding to a customer interaction, storing a data object corresponding to the first customer interaction data structure; and providing to a second business channel formatting information corresponding to the first customer interaction data structure. The first and second business channels may thus use independent data structures for storing their customer interaction information in a centralized database. The first and second data structures may view the other's data structures using formatting from the other channel.

12 Claims, 4 Drawing Sheets

CROSS CHANNEL CONTACT HISTORY MANAGEMENT

FIELD OF TECHNOLOGY

Aspects of the disclosure relate to providing apparatus and methods for sharing contact information. In particular, the disclosure relates to apparatus and methods for distributing customer contact information among channels within an organization.

BACKGROUND

An organization may seek to record information about interactions between parties and the organization. Typically the organization will store transaction records in a central database. In a business context, the organization may be a business, such as a financial institution, and the parties may be customers. If the business is large, it may include different channels with which the customers interact. Customer interaction information recording and retrieval may enhance customer service quality.

Often, each channel in the business will maintain its own customer history records. Typically, one or more of the different channels will have customized requirements for the type and format of information that is stored in the records. Each of the channels may use data entry and reporting platforms that have data storage formats that are not designed to be processed by the data entry and reporting platforms of other channels.

For example, in the financial services industry, a business's call center may record for each customer transaction a transaction type, such as "stop payment," "fraud report," or "new check order." The call center may require that attributes of the transactions be recorded. Table 1 shows typical attributes of the call center's transaction types.

TABLE 1

Typical attributes for call center transaction types.

| Transaction type | Attribute |
| --- | --- |
| Stop payment | Request date |
|  | Request time |
|  | Account number |
|  | Check number |
| Fraud report | Request time |
|  | Numbers of accounts affected |
|  | Fraudulent event date |
| New check order | Account number |
|  | Cosigner name |
|  | Check style |
|  | New check starting number |

The business also may include, for example, a web chat customer assistance channel as part of a business web site. The web chat customer assistance channel may record for each customer transaction a transaction type such as "Password assistance," "web site navigation assistance," and "product information request." The web chat customer assistance channel may require that attributes of the transactions be recorded. Table 2 shows typical attributes of the chat customer assistance channel.

TABLE 2

Typical attributes for chat customer assistance channel transaction types.

| Transaction type | Attribute |
| --- | --- |
| Password assistance | Customer name |
|  | Customer logon |
|  | Customer secret question reply |
| Web site navigation assistance | Customer name |
|  | Customer last page viewed |
|  | Customer information requested |
|  | Target web page |
| Product information request | Customer name |
|  | Information requested |
|  | Product suggested |
|  | Information or link provided |

The transaction types and corresponding attributes of the call center and the web chat assistance channel are different. Nevertheless, customer transaction information from one of the channels may be valuable to the other channel. For example, the call center may benefit from a transaction record recorded by the web chat assistance channel corresponding to a customer request for web site navigation assistance. The customer may have had difficulty finding a fraud reporting telephone line on the business's web site.

In existing systems, though, channels are unable to view information stored by other channels even though records of many channels are stored in a central database. If, for example, the call center requests from the central database all records of interactions from the customer, the call center will not receive—or will not be able to decode—transaction records for the customer that are based on web chat assistance transactions.

In some circumstances, it may be practical to formulate an inclusive customer transaction record that includes fields that are designed for a number of different channels. Such an inclusive customer transaction record would be large, especially for businesses that engage in a high volume of customer transactions. The large transaction record would consume data system resources and degrade performance.

It would be desirable, therefore, to provide apparatus and methods for sharing contact information between business channels.

SUMMARY OF THE INVENTION

It is therefore an object of the invention to provide apparatus and methods for sharing contact information between business channels. Apparatus and methods for providing customer interaction information to a business channel are, therefore, provided. The apparatus and methods may involve receiving from a first business channel a first customer interaction data structure corresponding to a customer interaction with the first business channel; storing a data object that corresponds to the first customer interaction data structure; and transmitting to a second business channel formatting information corresponding to the first customer interaction data structure. The apparatus and methods may further involve transmitting to the second business channel a second customer interaction data structure that corresponds to the data object. Using the formatting information and the second data structure, the second business channel may view information about the customer interaction with the first business channel.

BRIEF DESCRIPTION OF THE DRAWINGS

The objects and advantages of the invention will be apparent upon consideration of the following detailed description.

DETAILED DESCRIPTION OF THE INVENTION

Apparatus and methods for providing customer interaction information to a business channel are provided. The apparatus and methods may involve receiving from a first business channel a first customer interaction data structure corresponding to a customer interaction with the first business channel; storing a data object that corresponds to the first customer interaction data structure; and transmitting to a second business channel formatting information corresponding to the first customer interaction data structure. The apparatus and methods may further involve transmitting to the second business channel a second customer interaction data structure that corresponds to the data object. Using the formatting information and the second data structure, the second business channel may view information about the customer interaction with the first business channel.

In some embodiments, the first customer interaction data structure may be an XML tag-value formatted record. The XML tag-value formatted record may include information about a customer interaction with the first business channel. The first business channel may design the XML tag-value formatted record to conform to the first business channel's needs for customer contact history data storage.

In some embodiments, the first channel may transmit the XML tag-value formatted record to a central database for storage and later retrieval. The database may be driven by a Java-based database engine such as that available under the trademark WEBSPHERE, as in the "WebSphere Customer Center," from the IBM Corporation of Armonk, N.Y. The database engine may provide support for a miscellaneous notes field corresponding to one or more of the customer interaction records that are stored in the database.

The first channel may transmit the XML tag-value formatted record to the database engine by storing the XML tag-value formatted record in the miscellaneous notes field. The XML tag-value formatted record may be referred to as a Contact History Augmentation Data ("CHAD") field.

The miscellaneous notes field has a length and a format that remains fixed and manageable while the XML tag-value formatted data structure may be customized by each channel. Other channels may decode or view the XML tag-value formatted data structure by using the formatting of the channel that input or encoded it.

The CHAD field may be used by any organization that interfaces with customers through multiple channels (e.g., online, telephone, self-service kiosks, in person, etc.).

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
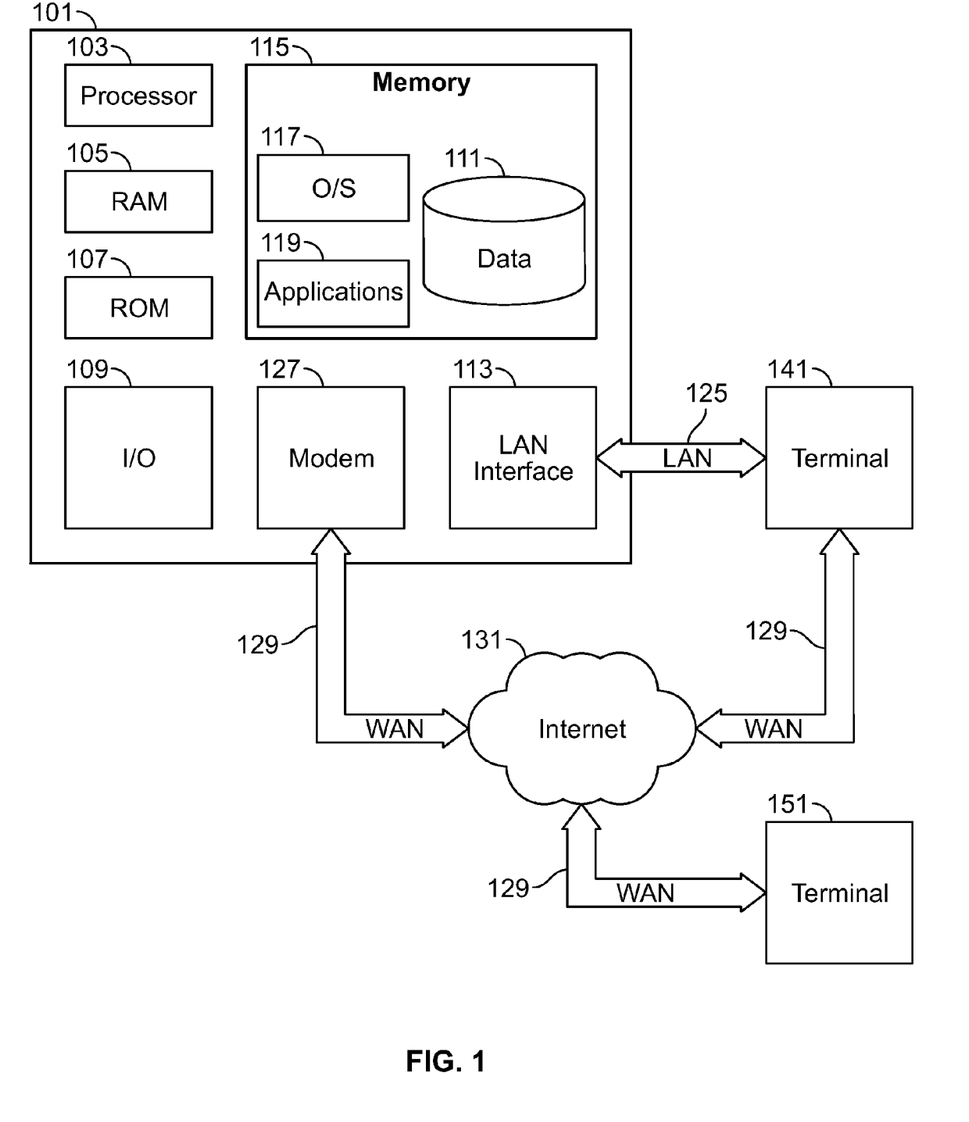
FIG. 1 shows apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for business channel identification information, customer transaction type information, transaction type attribute information and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Any information described above in connection with database 121, and any other suitable information, may be stored in memory 125.

One or more of applications 119 may include one or more algorithms that may be used to add, delete and/or edit a customer transaction record, receive and/or transmit a customer transaction record and perform any other suitable tasks related to cross channel distribution of customer contact information.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
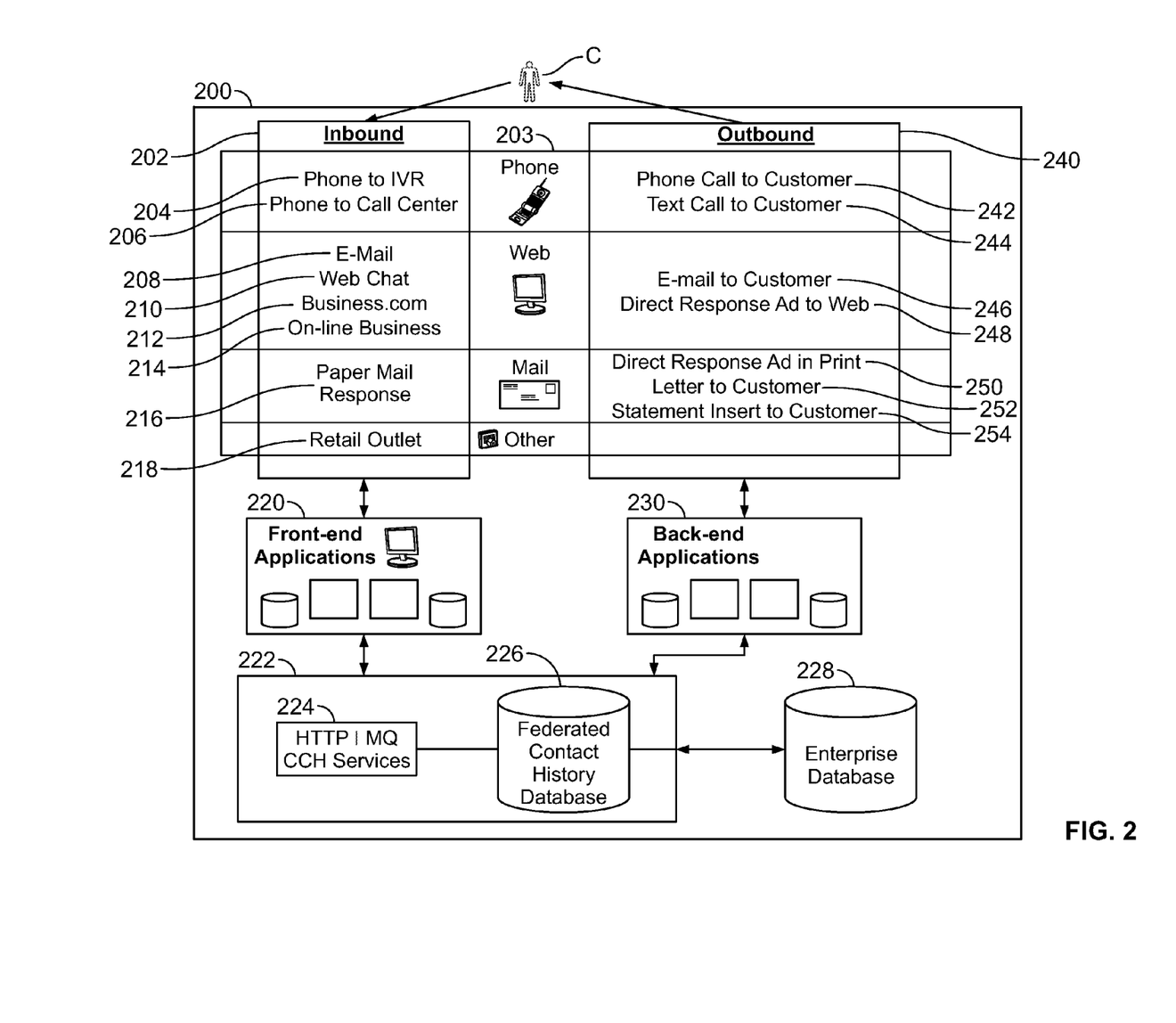
FIG. 2 shows a system schematic in accordance with the principles of the invention.

FIG. 2 shows illustrative multichannel system 200 for storing and retrieving customer contact information from a customer such as customer C. System 200 may include inbound channels 202. Inbound channels 202 may include phone to IVR (interactive voice response system) 204, phone to call center 206, e-mail 208, web chat 210, business.com web site 212, online business platform (such as an online banking platform) 214, paper mail (such as a response to a mail offer) 216, retail outlet (such as a retail banking branch office) 218 and any other suitable channels. Inbound channels 202 may be supported by one or more of communication devices 203.

Data flow through inbound channels 202 may be governed by front-end applications 220. Front end applications 220 may include any suitable applications such as a customer service interaction management application like MERLIN or INTERACT, automated telephone system software, or other suitable applications.

Each of front end applications 220 may transmit customer interaction information from one or more of inbound channels 202 to federated ("centralized") contact history engine 222. The customer interaction information may be transmitted in the form of XML tag-value formatted records. Federated contact history engine 222 may include federated contact history services platform 224. Federated contact history services platform 224 may include a queue that collects requests to add a customer transaction record. The queue may store the requests and then add them to federated contact history database 226 asynchronously (without acknowledgement or further communication to the front end application that submitted the request). Federated contact history database 226 may store contact history records from one or more of inbound channels 202.

Federated contact history database 226 may exchange customer contact records with enterprise database 228.

System 200 may include back end applications 230. Back end applications 230 may include any suitable applications such as an alert engine, a customer notification engine, an offer engine, a fulfillment engine or any other suitable engine. The alert engine may alert customer C or a retail associate about an event in customer C's account, such as a request for login information or the availability of an online invoice or statement. The customer notification engine may notify customer C about the availability of products and/or services. The offer engine may provide a retail associate with information about a product or service offer that may be presented to customer C. The fulfillment engine may print correspondence, statements, invoices and or checks and transmit them to customer C.

Back end applications 230 may provide customer interaction information to federated contact history engine 222. The customer interaction information may be transmitted in the form of XML tag-value formatted records. The customer interaction information may relate to interactions between back end applications 230 and the customer, such as those involving the alert engine, a customer notification engine, an offer engine, a fulfillment engine or any other suitable engine.

Outbound channels 240 may convey information between back end applications 230 and customer C. Outbound channels 240 may include phone call to customer 242, text message by phone to customer 244, e-mail to customer 246, direct response ad to web site 248, direct response ad in print 250, letter to customer 252, statement to customer 254 and any other suitable channels. Outbound channels 202 may be supported by one or more of communication devices 203.

Figure 3:
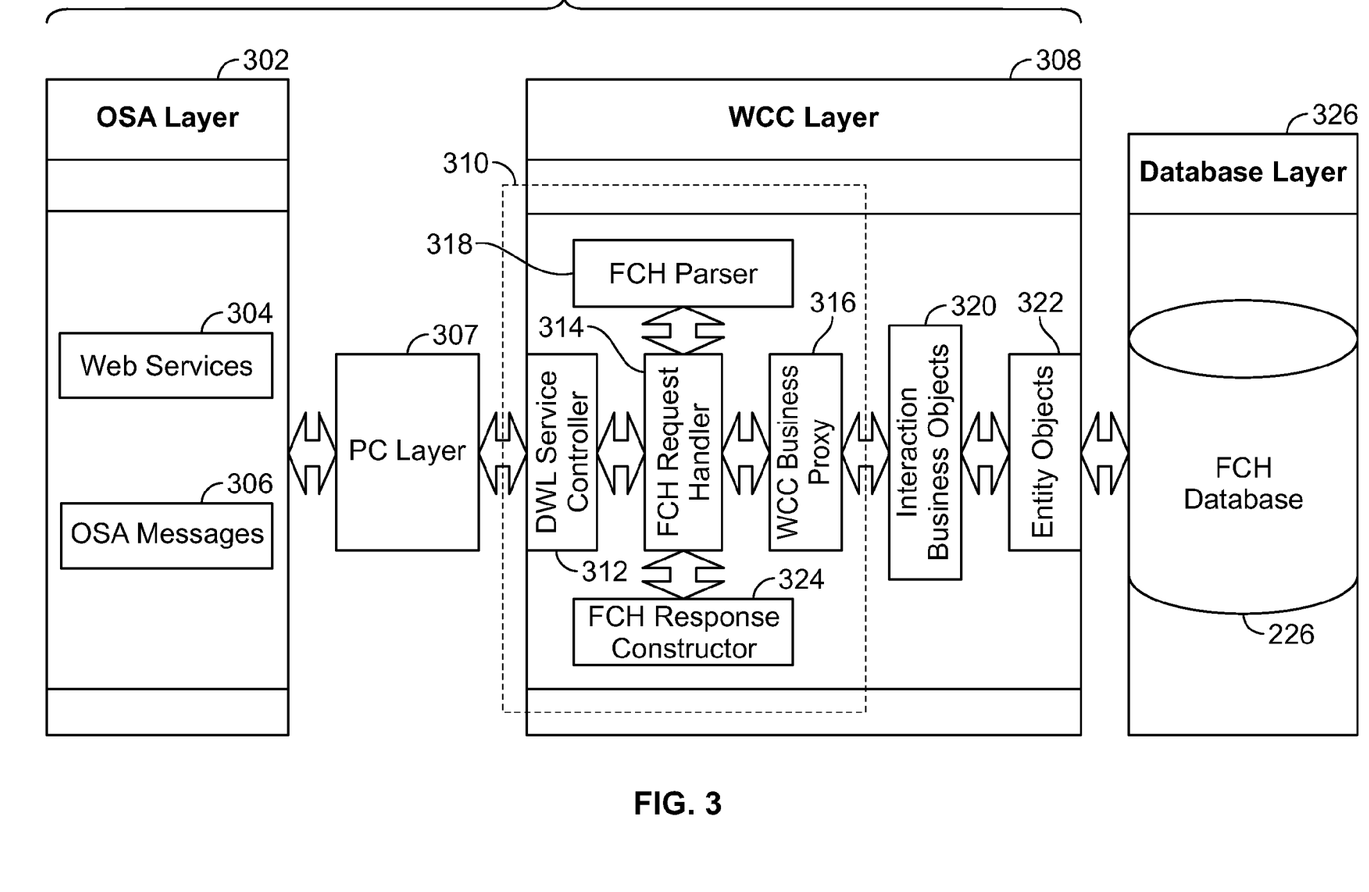
FIG. 3 shows a data processing architecture in accordance with the principles of the invention.

FIG. 3 shows illustrative layered architecture of database engine 300. Database engine 300 may govern inputs to and outputs from FCH database 226 (shown in FIGS. 2 and 3). Database engine 300 may include open system authentication ("OSA") layer 302. OSA layer 302 may include hardware and software for authenticating users. OSA layer 302 may be an interactive layer through which a client communicates with federated contact history database 226. In some embodiments, OSA layer 302 may be configured to communicate with the clients using XML-formatted data. OSA layer 302 may exchange Java objects with other elements shown in database engine 300. OSA layer 302 may be configured to convert XML inputs to Java objects and Java objects to XML outputs.

The client may run or interact with one or more of front end applications 220 (shown in FIG. 2) and back end applications 230. The client may access federated contact history engine 222 via a web services session 304 or via asynchronous messaging 306. The client may thus communicate with federated contact history engine 222 to add a customer contact history record to federated contact history database 226 or retrieve a customer contact history record from federated contact history database 226.

OSA layer 302 may include application program interfaces ("API's") such as "addContactHistory" and "getContactHistory" for adding to federated contact history database 226 and retrieving from federated contact history database 226, respectfully. The APIs may be implemented as OSA messages.

OSA layer 302 may include a module for logging performance metrics of federated contact history engine 222. Exceptions identified in federated contact history engine 222 may be converted to simple object access protocol ("SOAP") fault messages. SOAP may include a messaging protocol for communication within and between distributed systems. OSA layer 302 may process input SOAP messages, strip a request from the SOAP message, and send the request to intermediate personal computer ("PC") Layer 307. Processors in PC layer 307 may include one or more personal computers, hand-held processors, servers or any other suitable processors.

Intermediate PC layer 307 may be configured to handle business logic and cross service orchestration. PC layer 307 may be configured to validate OSA request header fields for the addContactHistory and getContactHistory APIs.

Database engine 300 may include WCC layer 308. WCC layer 308 may be supported by a data management software platform such as that available under the trademark WEBSPHERE, as in the "WebSphere Customer Center," from the IBM Corporation of Armonk, N.Y.

WCC layer 308 may include request/response framework 310. Request/response framework 310 may receive from PC layer 307 requests to add or retrieve customer contact history records and provide to PC layer 307 responses to the requests.

Request/response framework 310 may include DWL, Inc. (an IBM Corporation company; hereinafter, "DWL"), service controller 312. DWL service controller 312 may include a Java-based customer data hub that combines data from disparate systems. DWL service controller may be the single client-side point of entry for WCC layer 308. DWL service controller 308 may be implemented as a stateless session enterprise Java bean (a server side component architecture for a Java platform; hereinafter, "EJB"). DWL service controller 308 may, therefore, not be configured to wait for transaction results. WCC layer 308 may thus service many requests synchronously.

PC layer 307 may invoke a processRequest method of DWL service controller 312 by passing to DWL service controller context hash map parameters such as RequestType(Ex: Standard/OSA), Parser(Ex:TCRMService), OperationType (Ex:All), ResponseType (Ex:Standard/OSA), Constructor (Ex:TCRMService) and any other suitable parameters.

DWL service controller 312 may receive the requests from PC layer 307. DWL service controller 312 may route the requests to an appropriate request handler. DWL service controller 312 may use the request type parameter in conjunction with a DWL common extension properties file (not shown) to determine which request handler to use. Table 3 shows illustrative examples of entries in the DWL common extension properties file:

TABLE 3

Illustrative examples of entries in the DWL common extension properties file

DWL common extension properties

RequestType.tcrm.standard=com.dwl.base.requestHandler.-DWLRequestHandler
RequestType.tcrm.osa=com.bac.fch.request.-FederatedContactHistoryRequest-Handler The DWL request handler may be the default WCC layer 308 handler. The RequestType may be defined as "osa" in the Context hashmap. If so, federated contact history request handler 314 will be chosen as the handler. FCH request handler 314 may process the request.

In some embodiments, if the context hashmap operation type is 'Parse,' a class of FCH Request Handler 314 returns the corresponding parsed request object. If the operation type is 'Process,' FCH Request Handler 314 may pass the request object to WCC business proxy 316 for further processing.

In some embodiments, operation type may be optional. If operation type is not set, or if it is set to "All," FCH Request Handler 314 first parses the request object followed by business processing through WCC business proxy 316.

Response/request framework 310 may include FCH parser 318. FCH parser 318 may use the context hashmap parameter request type to determine which request parser factory to use. For example, FCH parser 318 may determine that a DWL Parser Factory (not shown) be used. The DWL Parser Factory may create a request parser based on the value of a parser key in the context hashmap. FCH parser 318 may include FCH Request Parser. FCH Request Parser may include a parse request that may parse the request object (viz., addContactHistoryRequest, getContactHistoryRequest or another suitable request object).

After parsing, FCH request handler 314 may interact with WCC business proxy 316 to process the request. WCC business proxy 316 may receive the request object. WCC business proxy 316 may interact with interaction business objects 320 and entity objects 322.

Business objects 320 may be value objects. Each of business objects 320 may correspond to one or more of entity objects 322. In some embodiments, each of business objects 320 may be either a getter or a setter. Getters retrieve values from entity objects. Setters set values in entity objects.

An entity object includes fields that correspond to names that are defined in a table for a given get or set method. The entity object may be used to pass data between entity beans and other components.

In WCC business proxy 316, once the entity objects are populated, a response constructor manager may determine the type of response constructor factory (viz., a DWL constructor factory, not shown) to use based on the response type parameter. The DWL constructor factory may create a response constructor based on constructor parameters in the context hashmap. For example, the DWL constructor factory may create FCH response constructor 324. FCH response constructor 324 may be configured to construct a response object that is passed to OA layer 302. The response object may correspond to the request object.

Database engine 300 may include database layer 326. Database layer 326 may include any suitable database application, such as that available under the trademark DB2 from the IBM Corporation of Armonk, N.Y. Database layer 326 may include FCH database 328. FCH database 328 may store one or more customer transaction records. FCH database 328 may include any suitable number of FCH code tables. In some embodiments, FCH database 328 may include three code tables.

In some embodiments, each customer interaction record in FCH database 328 may include a miscellaneous field. The miscellaneous field may have size of 1000 bytes or any other suitable size. The miscellaneous field may be used to store contact history augmentation data ("CHAD"). The CHAD may include platform independent (or substantially independent) data in a flexible format. For example, the CHAD may include data in XML tag-value format. Each channel may thus augment its customer contact history records with data that corresponds to pre-defined channel-specific fields. Different CHADs for different channels may use the miscellaneous field.

One or more of the code tables may correspond to an element or elements of the contact history augmentation data field.

Figure 4:
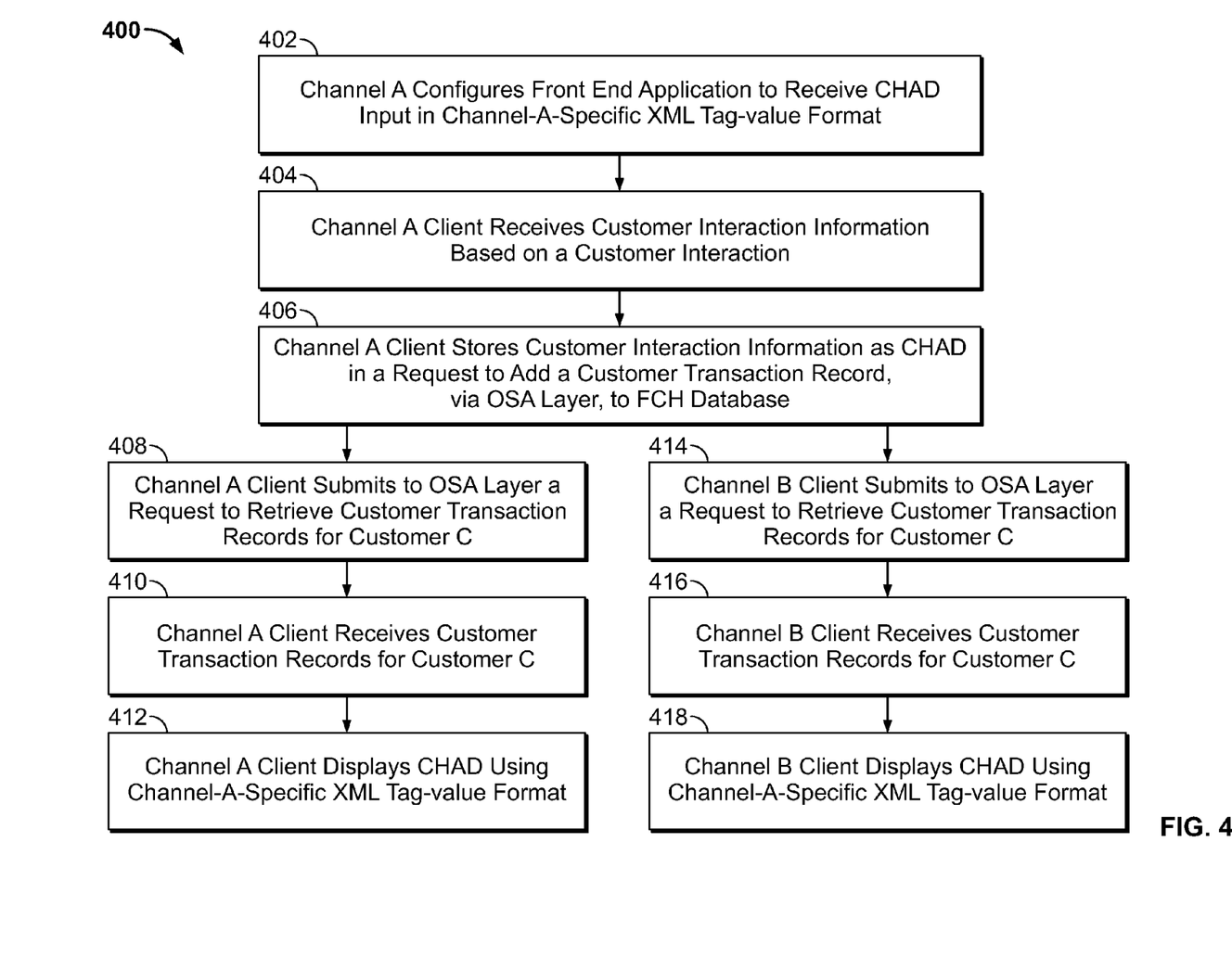
FIG. 4 shows steps of a process in accordance with the principles of the invention.

Processes in accordance with the principles of the invention may include one or more features of the process illustrated in FIG. 4. For the sake of illustration, the steps of the process illustrated in FIG. 4 will be described as being performed by a "system". The "system" may include one or more of the features of the apparatus that are shown in FIG. 1 and/or any other suitable device or approach. The "system" may be provided by an entity. The entity may be an individual, an organization or any other suitable entity.

FIG. 4 shows illustrative process 400. Process 400 may begin at step 402. At step 402, "Channel A" of a business may configure its front end application to receive customer history augmentation data ("CHAD") based on an interaction with customer C. The client may store the CHAD in a portable format, such as XML. At step 404, the Channel A client may receive customer interaction information based on a customer interaction. At step 406, the Channel A client may store the CHAD in a request to add a customer transaction record, via an OSA layer, to an FCH database. The OSA layer may convert the CHAD into a Java object.

Steps 408 through 412 later may be used by Channel A to retrieve the CHAD. At step 408, the Channel A client submits to the OSA layer a request to retrieve a set of customer transaction records for Customer C. At step 410, the Channel A client receives the set of customer transaction records for Customer C. At step 412, the Channel A client displays the CHAD using the Channel-A-specific XML tag-value format that was originally used to receive the data (in step 402).

Steps 414 through 418 may be used by Channel B to retrieve the CHAD—which was input by Channel A using Channel A's Channel-A-specific XML tag-value format. At step 414, a Channel B client submits to the OSA layer a request to retrieve a set of customer transaction records for Customer C. At step 416, the Channel B client receives the customer transaction records for Customer C. At step 418, the Channel B client may display the CHAD using the Channel-A-specific XML tag-value format. Channel B therefore gains access to the Channel A data when Channel B receives and utilizes the Channel-A-specific XML tag-value format.

Some embodiments may include an electronic library in which the Channel-A-specific XML tag-value format may be stored. The library may include a server. Channel B may retrieve the Channel-A-specific XML tag-value format to display or otherwise process the CHAD.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing customer interaction information to a business channel have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing customer interaction information to a business channel, the method comprising:
   using a receiver module in communication with an electronic communication network, receiving from a first business channel a first customer interaction data structure corresponding to a customer interaction, the first customer interaction data structure including the customer interaction information, wherein the first customer interaction data structure is encoded for decoding by the first business channel and is decodable by a second business channel only after the second business channel is provided with formatting information corresponding to the first data structure;
   storing a data object in machine readable memory, the data object corresponding to the first customer interaction data structure;
   using a transmitter module in communication with the electronic communication network, providing to a second business channel formatting information corresponding to the first customer interaction data structure; and
   configuring a client device of the second business channel to process the customer interaction information.

2. The method of claim 1 further comprising using the transmitter module, transmitting to the second business channel a second customer interaction data structure, the second customer interaction data structure corresponding to the data object.

3. The method of claim 1 further comprising configuring a client device of the first business channel to store customer interaction information in the first customer interaction data structure.

4. The method of claim 1 wherein the configuring the client device comprises configuring the client device to output the customer interaction information.

5. An apparatus for providing customer interaction information to a business channel, the apparatus comprising:
   a receiver module in communication with an electronic communication network configured to receive from a first business channel a first customer interaction data structure corresponding to a customer interaction, the first customer interaction data structure including the customer interaction information, wherein the first customer interaction data structure is encoded for decoding by the first business channel and is decodable by a second business channel only after the second business channel is provided with formatting information corresponding to the first data structure;
   machine readable memory in communication with the receiver module, the machine readable memory being configured to store a data object corresponding to the first customer interaction data structure;
   a transmitter module in communication with the electronic communication network, the transmitter module configured to provide to a second business channel formatting information corresponding to the first customer interaction data structure; and
   a client device of the second business channel that is configured to process the customer interaction information.

6. The apparatus of claim 5 wherein the transmitter module is further configured to transmit to the second business channel a second customer interaction data structure, the second customer interaction data structure corresponding to the data object.

7. The apparatus of claim 5 further comprising a client device of the first business channel that is configured to store customer interaction information in the first data structure.

8. The apparatus of claim 5 wherein the client device of the second business channel is configured to display the customer interaction information in a human readable format.

9. The apparatus of claim 5 further comprising a formatting information server configured to provide to the second channel the formatting information corresponding to the first customer interaction data structure.

10. One or more computer-readable media storing computer-executable instructions which, when executed by a processor on a computer system, perform a method for providing customer interaction information to a business channel, the method comprising:

receiving from a first business channel a first customer interaction data structure corresponding to a customer interaction, the first customer interaction data structure including the customer interaction information, wherein the first customer interaction data structure is encoded for decoding by the first business channel and is decodable by a second business channel only after formatting information corresponding to the first data structure is distributed to the second business channel;

storing a data object in machine readable memory, the data object corresponding to the first customer interaction data structure;

storing in machine readable memory formatting information corresponding to the first customer interaction data structure;

distributing the formatting information to the second business channel; and configuring a client device of the second business channel to process the customer interaction information.

11. The media of claim 10 wherein the method further comprises transmitting to the second business channel a second customer interaction data structure, the second customer interaction data structure corresponding to the data object.

12. The media of claim 10 wherein the method further comprises configuring a client device of the first business channel to store customer interaction information in the first data structure.

* * * * *

UNITED STATES PATENT AND TRADEMARK OFFICE
CERTIFICATE OF CORRECTION

| | | |
|---|---|---|
| PATENT NO. | : 8,369,504 B2 | Page 1 of 1 |
| APPLICATION NO. | : 12/407088 | |
| DATED | : February 5, 2013 | |
| INVENTOR(S) | : Jonathan R. Sampson et al. | |

It is certified that error appears in the above-identified patent and that said Letters Patent is hereby corrected as shown below:

On the cover of the patent, item (75), please replace inventor "David A. Tyson" with
--David C. Tyson--.

Signed and Sealed this
Twenty-sixth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,369,504 B2  Page 1 of 1
APPLICATION NO. : 12/407088
DATED : February 5, 2013
INVENTOR(S) : John R. Sampson et al.

It is certified that error appears in the above-identified patent and that said Letters Patent is hereby corrected as shown below:

On the title page item (75), line 1, please replace inventor "Jonathan R. Sampson Matthews, NC" with --John R. Sampson Charlotte, NC--

Signed and Sealed this
Twelfth Day of July, 2016

Michelle K. Lee
*Director of the United States Patent and Trademark Office*